(12) United States Patent
Murayama et al.

(10) Patent No.: US 8,908,270 B2
(45) Date of Patent: Dec. 9, 2014

(54) MICROSCOPE APPARATUS

(75) Inventors: Yoshiaki Murayama, Tokyo (JP);
Ikutoshi Fukushima, Tokyo (JP)

(73) Assignee: Olympus Corporation, Tokyo (JP)

( * ) Notice: Subject to any disclaimer, the term of this patent is extended or adjusted under 35 U.S.C. 154(b) by 232 days.

(21) Appl. No.: 13/297,671

(22) Filed: Nov. 16, 2011

(65) Prior Publication Data

US 2012/0127552 A1 May 24, 2012

(30) Foreign Application Priority Data

Nov. 18, 2010 (JP) ................................. 2010-258035

(51) Int. Cl.
*G02B 21/06* (2006.01)
*G02B 21/00* (2006.01)
*G02B 26/10* (2006.01)

(52) U.S. Cl.
CPC ............ *G02B 21/002* (2013.01); *G02B 26/101* (2013.01)
USPC .......................... 359/385; 359/210.2; 359/389

(58) Field of Classification Search
USPC ......... 359/362–363, 364–367, 368, 384–390, 359/433–435, 813, 822, 677, 197.1–200.8, 359/205.1–207.6, 209.1–210.2, 226.2
See application file for complete search history.

(56) References Cited

U.S. PATENT DOCUMENTS 4,248,495 A * 2/1981 Minoura ..................... 359/210.1
5,355,252 A * 10/1994 Haraguchi ..................... 359/369
5,760,951 A * 6/1998 Dixon et al. .................. 359/385
7,180,661 B2 2/2007 Sasaki
7,326,899 B2 * 2/2008 Ri .............................. 250/201.3

FOREIGN PATENT DOCUMENTS

| JP | 07-146448 A | 6/1995 |
| JP | 10-068901 A | 3/1998 |
| JP | 2001-91848 A | 4/2001 |
| JP | 2001-506378 A | 5/2001 |
| JP | 2002-62504 A | 2/2002 |
| JP | 2005-165212 A | 6/2005 |
| JP | 2006-106337 A | 4/2006 |
| JP | 2007-101876 A | 4/2007 |

* cited by examiner

*Primary Examiner* — Stephone B Allen
*Assistant Examiner* — James McGee
(74) *Attorney, Agent, or Firm* — Westerman, Hattori, Daniels & Adrian, LLP

(57) ABSTRACT

Illuminating light is two-dimensionally scanned without changing the ability to focus the illuminating light on a specimen. Provided is a microscope apparatus including a spatial light modulator that modulates the wavefront of illuminating light; a scanner that two-dimensionally scans the illuminating light by pivoting two mirrors; a relay optical system that relays an image in the scanner to a pupil position of an objective optical system; and a beam-shift mechanism that moves rays of the illuminating light between the modulator and the objective optical system in response to pivoting of the mirrors. The beam-shift mechanism moves the rays such that the image at the pupil position, when assuming that the mirrors are stationary, is moved in the direction opposite to the direction in which the image relayed to the pupil position by the relay optical system, when assuming that the mirrors are pivoted with the rays fixed, is moved.

9 Claims, 6 Drawing Sheets

MICROSCOPE APPARATUS

BACKGROUND OF THE INVENTION

1. Field of the Invention

The present invention relates to microscope apparatuses.

This application is based on Japanese Patent Application No. 2010-258035, the content of which is incorporated herein by reference.

2. Description of Related Art

In a conventionally known scanning confocal microscope apparatus, a laser beam whose wavefront is deformed by a deformable mirror is made incident on an objective lens via a galvanometer mirror unit (for example, see the DESCRIPTION of U.S. Pat. No. 7,180,661). This apparatus is configured to change the point at which the laser beam is focused in the depth direction by changing a reflective surface of the deformable mirror.

Furthermore, a scanner apparatus in which a galvanometer mirror is translated in the optical-axis direction in synchronization with pivoting of the galvanometer mirror is known (for example, see Japanese Unexamined Patent Application, Publication No. Hei 10-68901). This scanner apparatus can prevent a laser beam from being displaced from the center of the pupil of an objective lens due to pivoting of the galvanometer mirror and blocked by a lens frame or the like, causing non-uniform display due to insufficient light intensity.

If light incident on the galvanometer mirror is a plane wave, with the scanner apparatus disclosed in Japanese Unexamined Patent Application, Publication No. Hei 10-68901, the laser beam can be made constantly incident on the center of the pupil of the objective lens, and the light focusing ability at this time can be maintained.

In the method disclosed in Japanese Unexamined Patent Application, Publication No. Hei 10-68901, the optical path length of the laser beam is varied by translating the galvanometer mirror. Therefore, if light incident on the entrance pupil position of the objective lens is not a plane wave but light whose wavefront is modulated, as disclosed in the DESCRIPTION of U.S. Pat. No. 7,180,661, the position optically conjugate with the pupil position of the objective lens is varied, and thus, the ability to focus the laser beam is changed. Although, in the strict sense, the light focusing ability can be changed when light incident on the entrance pupil position of the objective lens is a plane wave, the influence on the light focusing ability is relatively large with light whose wavefront is modulated.

BRIEF SUMMARY OF THE INVENTION

The present invention provides a microscope apparatus that can two-dimensionally scan illuminating light guided from a light source across a specimen, without changing the ability to focus the illuminating light on the specimen.

The present invention provides a microscope apparatus including a spatial light modulator that modulates the wavefront of illuminating light from a light source; a scanner that has two mirrors independently pivoted about two non-parallel axes and thus two-dimensionally scans the illuminating light whose wavefront has been modulated by the spatial light modulator; a relay optical system that relays an image in the scanner to a pupil position of an objective optical system; and a beam-shift mechanism that moves rays of the illuminating light in a direction intersecting the optical axis, in response to pivoting of the mirrors, between the spatial light modulator and the objective optical system. The beam-shift mechanism moves the rays such that the image at the pupil position of the objective optical system, when assuming that the mirrors are stationary, is moved in the direction opposite to the direction in which the image relayed to the pupil position of the objective optical system by the relay optical system, when assuming that the mirrors are pivoted with the rays fixed, is moved.

DETAILED DESCRIPTION OF THE INVENTION

A microscope apparatus 1 according to an embodiment of the present invention will be described below with reference to the drawings.

Figure 1:
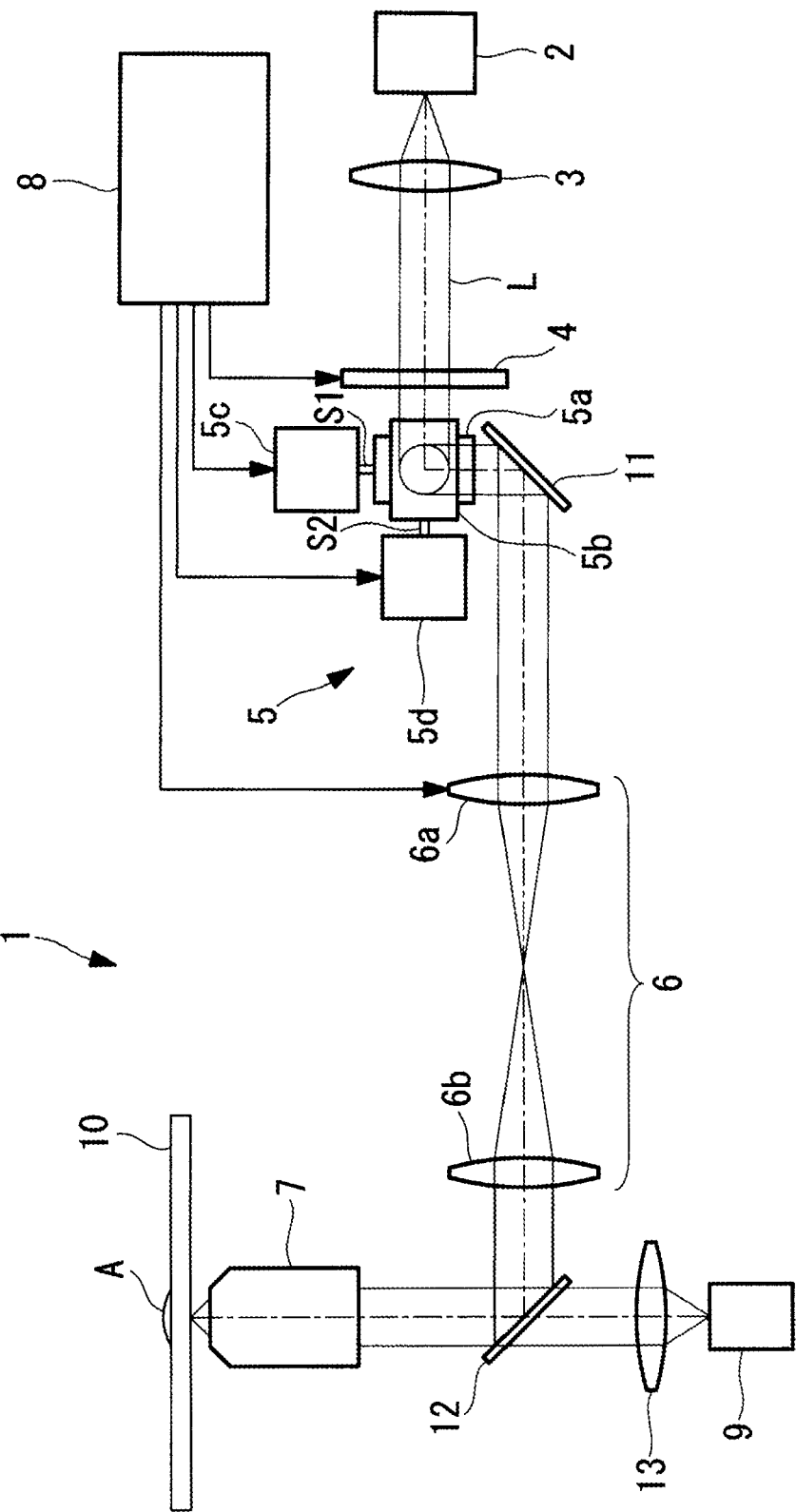
FIG. 1 is a diagram showing the overall configuration of a microscope apparatus according to an embodiment of the present invention.

As shown in FIG. 1, the microscope apparatus 1 according to this embodiment includes a light source 2 that generates a laser beam (illuminating light) L; a collimator lens 3 that converts the wavefront of the laser beam L generated by the light source 2 into a substantially plane wave; a spatial light modulator 4 that modulates the wavefront of the laser beam L converted into a substantially plane wave; a scanner 5 that two-dimensionally scans the laser beam L whose wavefront has been modulated by the spatial light modulator 4; a relay optical system 6 that relays the laser beam L scanned by the scanner 5; an objective optical system 7 that focuses the laser beam L relayed by the relay optical system 6; a control unit (a beam-shift mechanism) 8 that controls the spatial light modulator 4, the scanner 5, and at least a lens 6a (a beam-shift mechanism) that constitutes the relay optical system 6; and a photodetector 9 that detects fluorescence coming from a specimen A collected by the objective optical system 7. In the figure, reference sign 10 denotes a stage that carries the specimen A placed on a slide glass.

The spatial light modulator 4 is of the transmission type and is composed of, for example, a liquid crystal device in which liquid crystal cells are arrayed in a planar configuration. The refractive index of each cell is changed according to the voltage applied to that cell. The spatial light modulator 4 modulates the wavefront of the laser beam L by shifting the phases, at respective positions, of the wavefront of the laser beam according to the refractive indices of the cells when the laser beam L converted into a substantially plane wave by the collimator lens 3 passes therethrough. The laser beam L having passed through the spatial light modulator 4 is incident on the scanner 5.

Herein, the spatial light modulator 4 gives the laser beam L a wavefront such that the laser beam L has a desired wavefront shape at the midpoint between a pair of mirrors 5a and 5b of the scanner 5 (described below). That is, the spatial light modulator 4 gives the laser beam L a wavefront shape such that a wavefront shape that compensates for a change in the wavefront shape generated in the optical path between the spatial light modulator 4 and the midpoint between the mirrors 5a and 5b is added to a desired wavefront shape.

Figure 2:
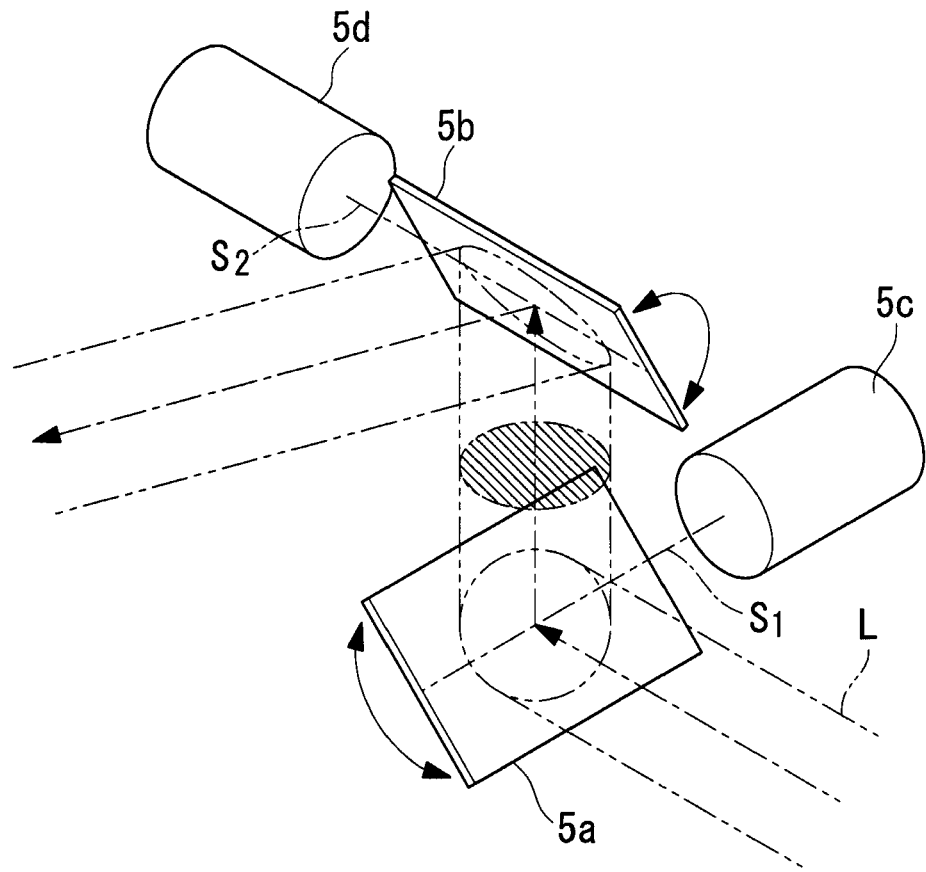
FIG. 2 shows a scanner of the microscope apparatus in FIG. 1 and is a perspective view showing an example in which a position optically conjugate with a pupil position of an objective optical system is located between a high-speed mirror and a low-speed mirror.

As shown in FIG. 2, the scanner 5 includes two mirrors 5a and 5b that can pivot about two pivot axes $S_1$ and $S_2$ disposed in a skewed manner, respectively. One pivot axis $S_1$ is disposed in a plane perpendicular to the other pivot axis $S_2$. With this configuration, as shown in FIG. 1, the two pivot axes $S_1$ and $S_2$ are disposed perpendicular to each other as viewed from one direction along the above-mentioned plane. Herein, the midpoint between the mirrors 5a and 5b is located at a position optically conjugate with the entrance pupil position of the objective optical system 7. The hatching in FIG. 2 shows that the midpoint between the mirrors 5a and 5b is located at the position optically conjugate with the entrance pupil position of the objective optical system 7.

One mirror 5a is designed to pivot at a sufficiently higher pivot speed than the other mirror 5b. The high-speed mirror 5a is used to scan the laser beam L across the specimen A, and the low-speed mirror 5b is used to advance the scanning position of the laser beam L on the specimen A. In the figure, reference signs 5c and 5d denote motors for pivoting the mirrors 5a and 5b, and reference sign 11 denotes a mirror.

Figure 3:
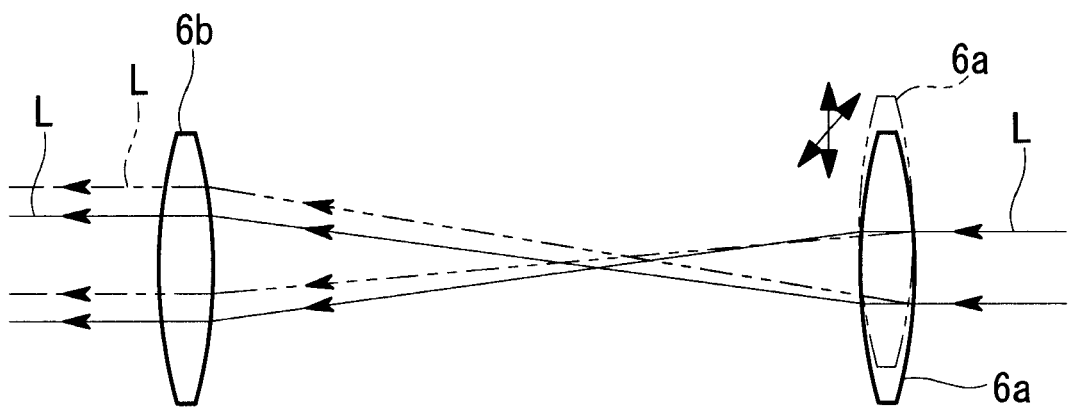
FIG. 3 is a diagram for describing the movement of a lens that constitutes a relay optical system.

The relay optical system 6 is composed of a plurality of (two in the example shown) lenses 6a and 6b. The relay optical system 6 is configured to relay an image formed at the midpoint between the mirrors 5a and 5b to the entrance pupil position (the pupil position) of the objective optical system 7. As shown in FIG. 3, at least one of the plurality of lenses 6a and 6b (the lens 6a disposed on the light source 2 side in the example shown) is provided such that it can be translated in two-axial directions perpendicular to each other in a plane perpendicular to the optical axis of the laser beam L. The movement of the lens 6a causes the laser beam (rays) L to move in a direction intersecting the optical axis.

In FIG. 1, reference sign 12 denotes a dichroic mirror that reflects the laser beam L while allowing the fluorescence to pass therethrough, and reference sign 13 denotes a condenser lens. The fluorescence having passed through the dichroic mirror 12 is focused by the condenser lens 13 and is detected by the photodetector 9. By storing the intensity of the fluorescence detected by the photodetector 9 in association with information about the position of the laser beam L scanned by the scanner 5 at the time of the detection, a two-dimensional fluorescence image can be obtained.

The control unit 8 outputs to the spatial light modulator 4 a voltage-application instruction signal for applying a voltage to each cell, so that the refractive index of each cell is equal to the preset value. The refractive index of each cell of the spatial light modulator 4 is such a value that it can modulate the wavefront of the incident plane wave and focus it to one point at the focal position of the objective optical system 7, and it can be calculated or measured in advance, taking various aberrations of the optical systems, the refractive index distribution of the specimen A, etc., into consideration.

Furthermore, the control unit 8 outputs angle instruction signals for instructing the pivot angles to the motors 5c and 5d that cause the mirrors 5a and 5b of the scanner 5 to pivot. In synchronization with this angle instruction signals, the control unit 8 outputs a movement instruction signal for translating the lens 6a constituting the relay optical system 6 in two-axial directions perpendicular to the optical axis.

Figure 4:
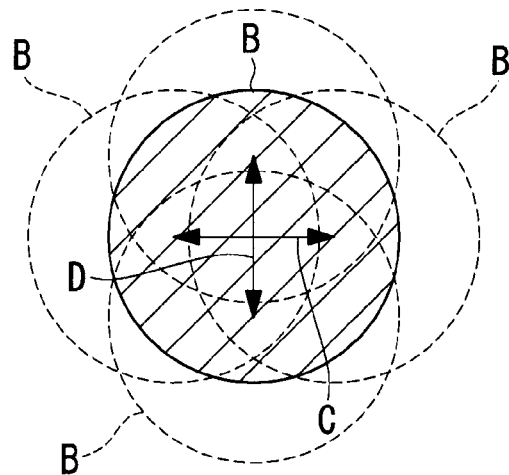
FIG. 4 is a diagram for describing the movement of an image at the entrance pupil position of the objective optical system of the microscope apparatus in FIG. 1, in the case of FIG. 2.

More specifically, as shown in FIG. 4, the lens 6a is translated in the direction of arrow C in response to pivoting of the low-speed mirror 5b such that the image B of the laser beam L, when assuming that the low-speed mirror 5b is fixed, is moved in the direction opposite to the direction in which the image B of the laser beam L at the entrance pupil position of the objective optical system 7, when assuming that the low-speed mirror 5b is pivoted with the high-speed mirror 5a fixed, is moved. Regarding pivoting of the high-speed mirror 5a, similarly to pivoting of the low-speed mirror 5b, the lens 6a is translated in the direction of arrow D perpendicular to the direction of arrow C, in the direction opposite to the direction in which the image B is moved in response to pivoting of the high-speed mirror 5a.

The operation of the thus-configured microscope apparatus 1 according to this embodiment will be described below.

In order to observe the fluorescence coming from the specimen A using the microscope apparatus 1 according to this embodiment, the laser beam L generated by the light source 2 is converted into a substantially plane wave by the collimator lens 3 and is made incident on the spatial light modulator 4, in a state in which the control unit 8 outputs a voltage-application instruction signal for instructing the spatial light modulator 4 to apply a voltage to each cell.

The laser beam L having passed through the spatial light modulator 4 travels in a straight line and is incident on the scanner 5. In the scanner 5, the high-speed mirror 5a is pivoted to make the incident laser beam L pivot in the scanning direction, and the low-speed mirror 5b is pivoted to make the incident laser beam L pivot in the advancing direction. Thus, the laser beam L is two-dimensionally scanned.

The laser beam L scanned by the scanner 5 is incident on the relay optical system 6. The relay optical system 6 relays the image of the laser beam L formed at the midpoint between the two mirrors 5a and 5b to the entrance pupil position of the objective optical system 7 located at a position optically conjugate therewith.

In this case, by activating the scanner 5 with the lens 6a fixed, the image of the laser beam L relayed to the entrance pupil position of the objective optical system 7 is moved linearly in the two-axial directions intersecting the optical axis, in response to the pivoting of the mirrors 5a and 5b. The movement direction associated with pivoting of the scanner 5 is assumed to be direction P, and the amount of movement is assumed to be ΔP. The image of the laser beam relayed to the entrance pupil position of the objective optical system 7 is also moved in a direction intersecting the optical axis by moving the lens 6a with the mirrors 5a and 5b fixed. This movement direction is assumed to be direction Q, and the amount of movement is assumed to be ΔQ.

In this embodiment, the control unit 8 moves the lens 6a such that the direction P is opposite to the direction Q and such that ΔP=ΔQ to shift the position of the laser beam L. Therefore, the image of the laser beam L relayed to the entrance pupil position of the objective optical system 7 can be kept stationary, regardless of the pivoting of the mirrors 5a and 5b. Because the laser beam L incident on the entrance pupil position does not move in the direction intersecting the optical axis, the laser beam L can be made incident on the entire entrance pupil. Thus, illumination can be performed with the maximum brightness.

Furthermore, in this case, the lens 6a constituting the relay optical system 6 is moved in a direction intersecting the optical axis of the laser beam L so that the image at the entrance pupil position of the objective optical system 7 is not moved in response to the pivoting of the mirrors 5a and 5b of the scanner 5. Thus, the optical path length from the midpoint between the mirrors 5a and 5b to the entrance pupil position of the objective optical system 7 does not change, leading to an advantage in that the relaying relationship between the midpoint of the mirrors 5a and 5b and the entrance pupil position of the objective optical system 7 does not need to be changed. Accordingly, even in the case where the wavefront of the relayed laser beam L is not a plane wave, the wavefront of the laser beam L in a desired shape, given by the spatial light modulator 4, can be accurately relayed to the entrance pupil position of the objective optical system 7, preventing degradation of the light focusing ability.

With this configuration, various aberrations of optical systems and aberrations generated by the refractive index distribution of the specimen A, etc., are compensated for, leading to an advantage in that the laser beam L can be precisely focused on one desired point in the specimen A by the objective optical system 7. If the laser beam L generated by the light source 2 is an extremely short-pulse laser beam L, it is possible to obtain a sharp fluorescence image by generating fluorescence only at the focal position of the objective optical system 7 by the multiphoton excitation effect.

In addition, by locating the position optically conjugate with the entrance pupil position of the objective optical system 7 at the midpoint between the two mirrors 5a and 5b, the amounts of movement ΔP and ΔQ of the image at the entrance pupil position caused by the pivoting of the mirrors 5a and 5b is halved, i.e., minimized, compared with the case where the position optically conjugate with the entrance pupil position of the objective optical system 7 is disposed at one of the two mirrors 5a and 5b. Thus, the position of the image can be sufficiently fixed at the entrance pupil position by making the lens 6a sufficiently follow the pivoting of the mirrors 5a and 5b.

Figure 5:
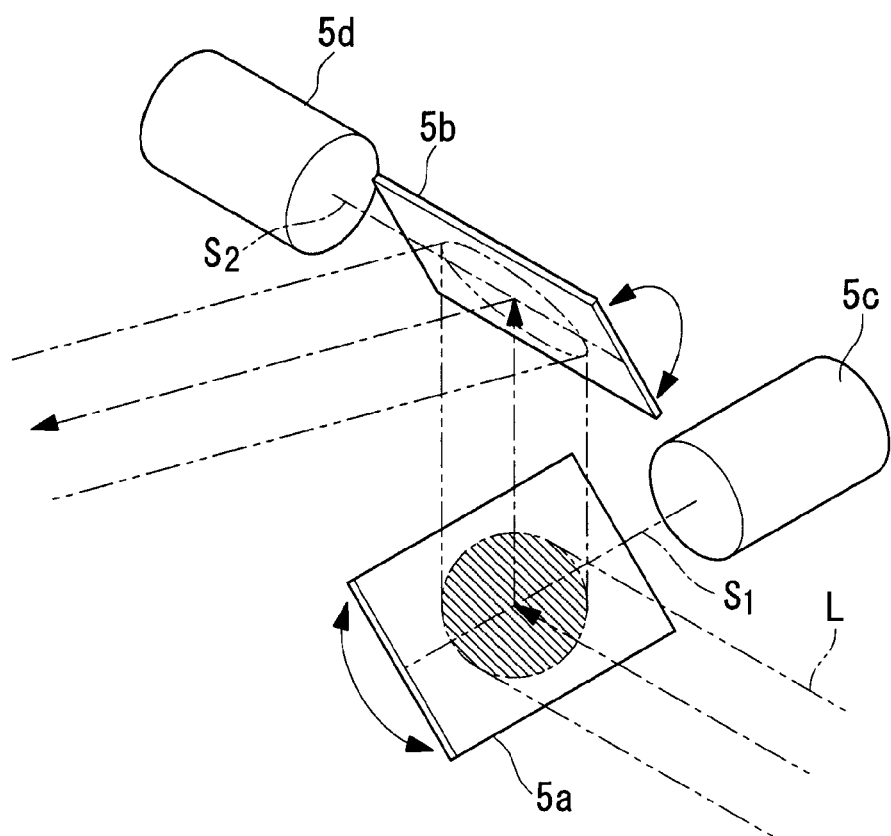
FIG. 5, which is a modification of FIG. 2, shows the scanner of the microscope apparatus in FIG. 1 and is a perspective view showing an example in which the position optically conjugate with the pupil position of the objective optical system is located on the pivot axis of the high-speed mirror.

Note that, although the position optically conjugate with the entrance pupil position of the objective optical system 7 is located at the midpoint between the pair of mirrors 5a and 5b in this embodiment, it may be located on one of the pivot axes $S_1$ and $S_2$ of the mirrors 5a and 5b instead. In such a case, as shown in FIG. 5, it is preferable that the position optically conjugate with the entrance pupil position of the objective optical system 7 be located on the pivot axis $S_1$ of the high-speed mirror 5a. The hatching in FIG. 5 shows that the high-speed mirror 5a is located at the position optically conjugate with the entrance pupil position of the objective optical system 7.

Figure 6:
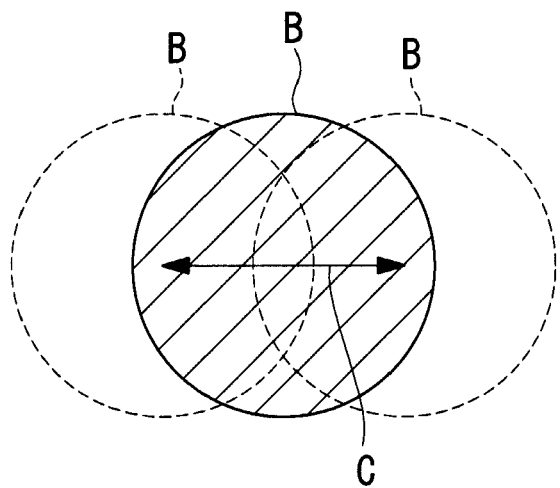
FIG. 6 is a diagram for describing the movement of the image at the entrance pupil position of the objective optical system of the microscope apparatus in FIG. 1, in the case of FIG. 5.

In this manner, the position optically conjugate with the surface of the spatial light modulator 4 and the entrance pupil position of the objective optical system 7 is located on the pivot axis $S_1$ of the high-speed mirror 5a constituting the scanner 5. Therefore, as shown in FIG. 6, the image of the laser beam L is moved only in one-axial direction, i.e., the direction of arrow C, at the entrance pupil position of the objective optical system 7, in response to the pivoting of the low-speed mirror 5b. That is, the lens 6a does not have to be moved in response to the pivoting of the high-speed mirror 5a.

Accordingly, the lens 6a may be translated in response to pivoting of the low-speed mirror 5b, which is sufficiently slower than the high-speed mirror 5a, and the responsiveness thereof may be low. Therefore, displacement of the image of the laser beam L incident on the entrance pupil position of the objective optical system 7 caused by the pivoting of the mirrors 5a and 5b can be more reliably prevented.

Although this embodiment employs the configuration in which the lens 6a constituting the relay optical system 6 is moved, the configuration of the beam-shift mechanism is not limited thereto, and another configuration that can move the laser beam L incident on the entrance pupil position of the objective optical system 7 in a direction intersecting the optical axis may be employed. Examples of other configurations of the beam-shift mechanism are shown in FIGS. 7 to 9.

Figure 7:
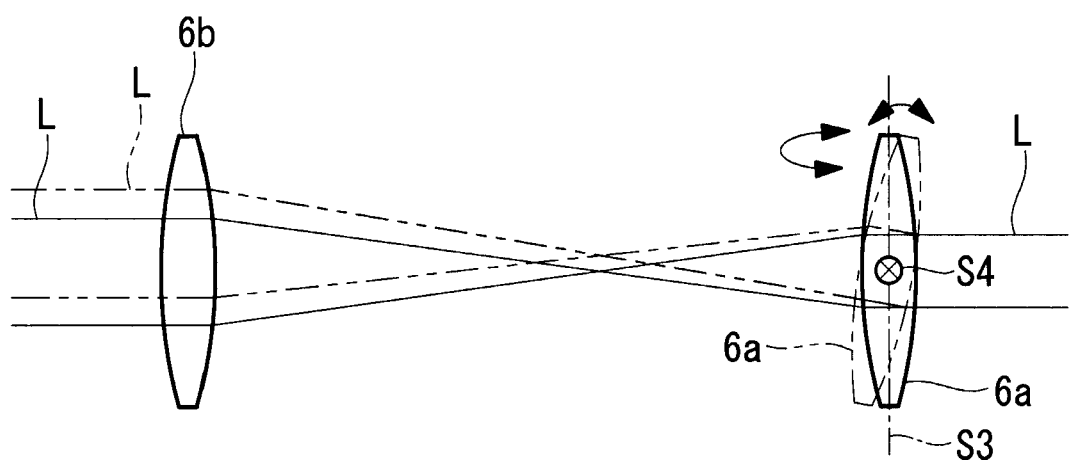
FIG. 7, which is a modification of FIG. 3, is a diagram for describing the movement of a lens that constitutes a relay optical system, when the lens is pivoted.

FIG. 7 shows an example of a configuration in which the lens 6a is pivoted about two pivot axes S3 and S4 that are perpendicular to each other and that intersect the optical axis of the laser beam L at right angles so that the lens 6a is inclined with respect to the optical axis of the laser beam L to move the laser beam L.

Figure 8:
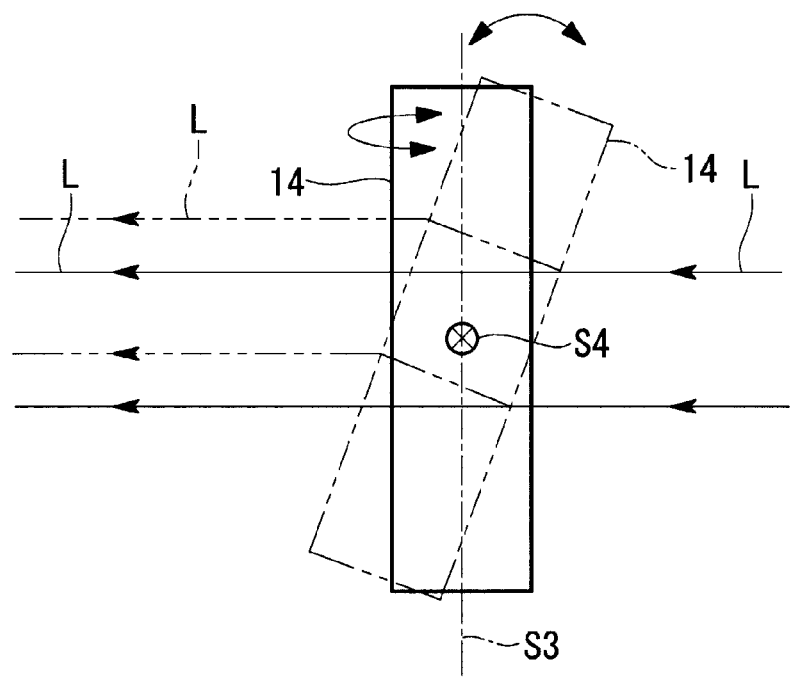
FIG. 8, which is a modification of a beam-shift mechanism, is a diagram for describing the movement of a parallel plate when a laser beam is moved by the parallel plate.

FIG. 8 shows an example of a configuration in which a parallel plate 14 disposed in the optical path from the spatial light modulator 4 to the objective optical system 7 is pivoted about the pivot axes S3 and S4 that are perpendicular to each other and that intersect the optical axis of the laser beam L at right angles so that the parallel plate 14 is inclined with respect to the optical axis of the laser beam L to move the laser beam L. Any parallel plate may be used as the parallel plate 14 as long as it has a refractive index that can refract the incident laser beam L.

Figure 9:
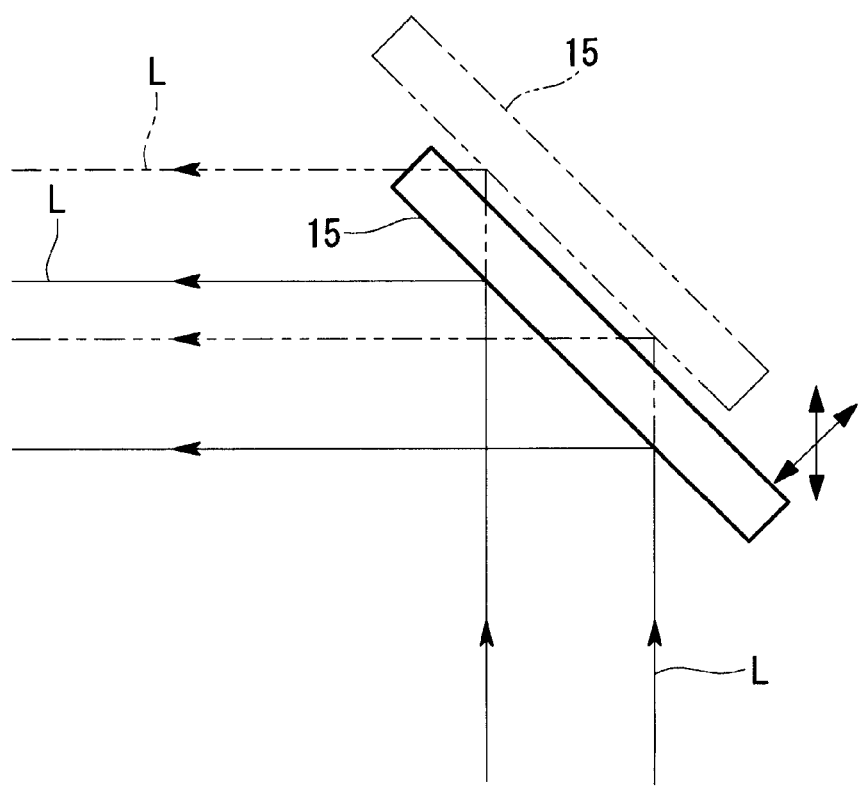
FIG. 9, which is another modification of the beam-shift mechanism, is a diagram for describing the movement of a mirror when a laser beam is moved by the mirror.

FIG. 9 shows an example of a configuration in which a mirror 15 disposed in the optical path from the spatial light modulator 4 to the objective optical system 7 is translated to move the laser beam L.

The parallel plate 14 and the mirror 15 may be disposed at any positions as long as they are located in the optical path from the spatial light modulator 4 to the objective optical system 7.

Also by making the optical device inclined with respect to the optical axis in the optical path from the spatial light modulator 4 to the objective optical system 7 or by moving the optical device other than the lens 6a like this, the laser beam L can be moved such that the image is stationary at the entrance pupil position of the objective optical system 7.

Figure 10:
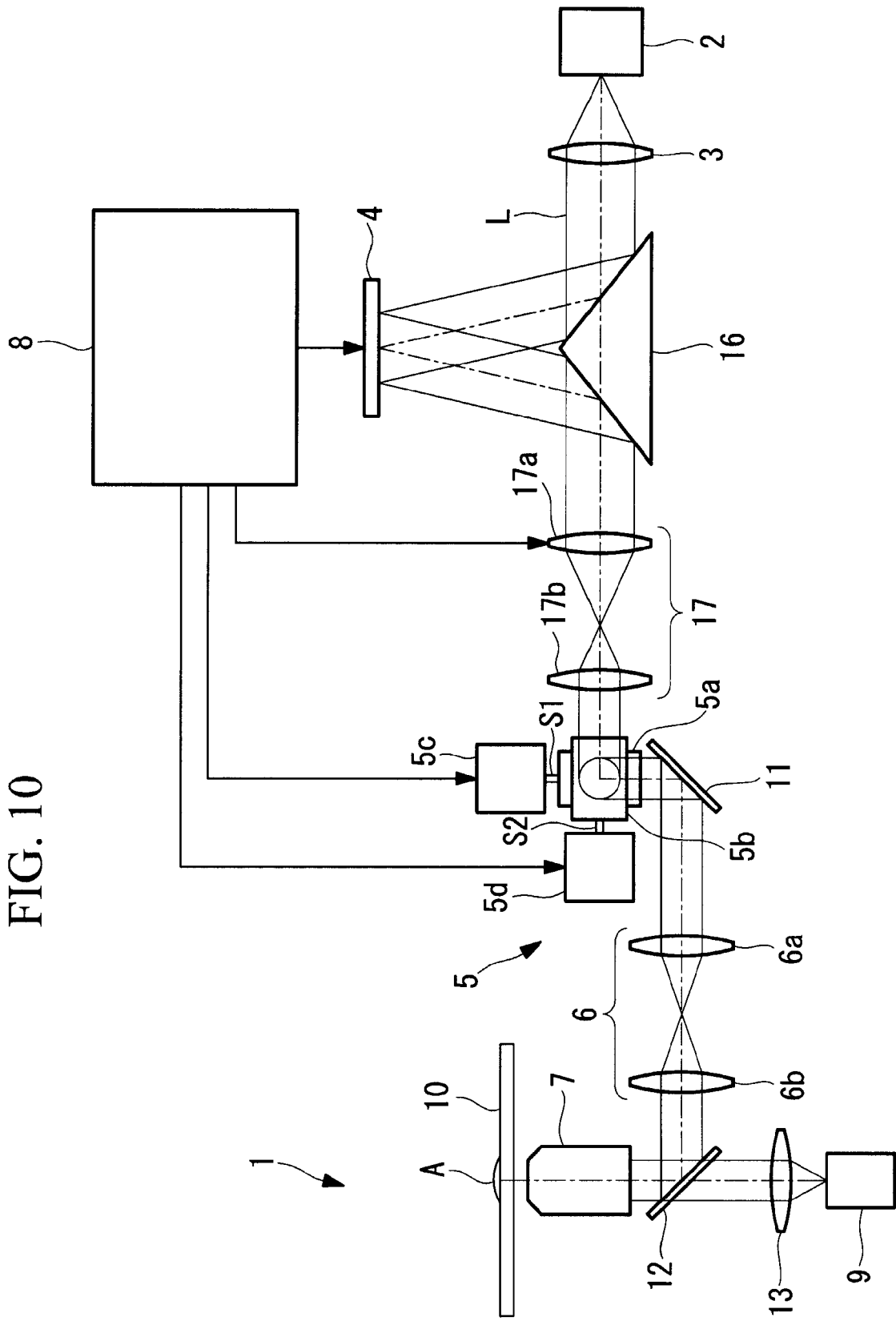
FIG. 10, which is a modification of the microscope apparatus in FIG. 1, is a diagram showing an example in which another relay optical system is provided between the spatial light modulator, which is of the reflective type, and the scanner.

Although the spatial light modulator 4 modulates the wavefront of the laser beam L to realize a desired wavefront shape at the midpoint between the mirrors 5a and 5b in this embodiment, instead of this, as shown in FIG. 10, another relay optical system 17 may be disposed between the spatial light modulator 4 and the scanner 5 to give a desired wavefront shape to the laser beam L at the surface of the spatial light modulator 4. The other relay optical system 17 is composed of a plurality of lenses (two lenses 17a and 17b in the example shown) and is configured to relay the image formed on the spatial light modulator 4 to the midpoint between the mirrors 5a and 5b. That is, the surface of the spatial light modulator 4 is located at the position optically conjugate with the entrance pupil position of the objective optical system 7.

Note that FIG. 10 shows an example of a configuration in which the spatial light modulator 4 of the reflective type is used instead of the transmission type. Examples of the reflective spatial light modulator 4 include a segmented MEMS mirror whose surface shape is changed. Upon being reflected at the surface of the spatial light modulator 4, the laser beam L reflected by a prism 16 is modulated such that the wavefront thereof conforms to the surface shape of the spatial light modulator 4 and is returned to the prism 16.

In this configuration, it is preferable that the beam-shift mechanism moves at least one of the lenses 17a and 17b constituting the other relay optical system 17 (only the lens 17a in the example shown). Because the laser beam L is collimated in the other relay optical system 17, the image can be prevented from suffering from various aberrations caused by moving the laser beam L in a direction intersecting the optical axis.

What is claimed is:

1. A microscope apparatus comprising:
   a spatial light modulator that modulates a wavefront of illuminating light from a light source;
   a scanner that has two mirrors independently pivoted about two non-parallel axes and that two-dimensionally scans the illuminating light whose wavefront has been modulated by the spatial light modulator;
   a relay optical system that relays an image in the scanner to a pupil position of an objective optical system; and
   a beam-shift mechanism that moves rays of the illuminating light in a direction intersecting an optical axis, in response to pivoting of the mirrors, between the spatial light modulator and the objective optical system,
   wherein the beam-shift mechanism moves the rays such that the image at the pupil position of the objective optical system, when assuming that the mirrors are stationary, is moved in a direction opposite to a direction in which the image relayed to the pupil position of the objective optical system by the relay optical system, when assuming that the mirrors are pivoted with the rays fixed, is moved, and
   wherein the beam-shifting mechanism moves at least one lens of the relay optical system to keep the illuminating light relayed to the pupil position of the objective optical system stationary, regardless of the pivoting of the two mirrors.

2. The microscope apparatus according to claim 1, wherein the beam-shift mechanism moves at least one of optical devices constituting the relay optical system in a direction intersecting the optical axis.

3. The microscope apparatus according to claim 1, wherein the beam-shift mechanism causes at least one of optical devices constituting the relay optical system to pivot about a pivot axis intersecting the optical axis.

4. The microscope apparatus according to claim 1, wherein the relay optical system relays the image between the two mirrors to the pupil position.

5. The microscope apparatus according to claim 1, wherein the relay optical system relays the image on the pivot axis of one of the mirrors to the pupil position.

6. The microscope apparatus according to claim 5, wherein the relay optical system relays the image on the pivot axis of the mirror that is pivoted at a higher speed among the two mirrors to the pupil position.

7. The microscope apparatus according to claim 1, further comprising another relay optical system that relays an image on the spatial light modulator to the scanner.

8. The microscope apparatus according to claim 1, further comprising another relay optical system that relays an image on the spatial light modulator to the scanner,
   wherein the beam-shift mechanism moves at least one of optical devices constituting the other relay optical system in a direction intersecting the optical axis.

9. The microscope apparatus according to claim 1, further comprising another relay optical system that relays an image on the spatial light modulator to the scanner,
   wherein the beam-shift mechanism causes at least one of optical devices constituting the other relay optical system to pivot about a pivot axis intersecting the optical axis.

* * * * *